G. SCHWABE.
CHANGE BOX MOTION FOR POWER LOOMS.
APPLICATION FILED AUG. 14, 1909.

1,076,791.

Patented Oct. 28, 1913.
3 SHEETS—SHEET 1.

Witnesses
Theodor Schwarz
Friedrich Schwarz

Inventor
Georg Schwabe

G. SCHWABE.
CHANGE BOX MOTION FOR POWER LOOMS.
APPLICATION FILED AUG. 14, 1909.

1,076,791.

Patented Oct. 28, 1913.

3 SHEETS—SHEET 2.

G. SCHWABE.
CHANGE BOX MOTION FOR POWER LOOMS.
APPLICATION FILED AUG. 14, 1909.

1,076,791.

Patented Oct. 28, 1913.

3 SHEETS—SHEET 3.

UNITED STATES PATENT OFFICE.

GEORG SCHWABE, OF BIELITZ, AUSTRIA-HUNGARY.

CHANGE BOX-MOTION FOR POWER-LOOMS.

1,076,791.      Specification of Letters Patent.      Patented Oct. 28, 1913.

Application filed August 14, 1909. Serial No. 512,773.

*To all whom it may concern:*

Be it known that I, GEORG SCHWABE, a manufacturer and a subject of the Emperor of Austria-Hungary, and a resident of Bielitz, Austrian Silesia, part of the Austro-Hungarian Empire, have invented certain new and useful Improvements Relating to Change Box-Motions for Power-Looms, of which the following is a specification.

For wide looms running at a high speed it is preferable to provide each side of the loom with its separate change box motion in order that the vibrations and pushes produced by the transpositions of the box to the other side of the batten (when the change box motion is arranged on one side of the loom only) may be eliminated.

Generally the change box motion is arranged on the dobby motion side of the loom. In accordance with the present invention the change box motion is also provided on the driving side and the operation of the change box motion itself or the movement of the knives by which the rising and falling parts such as eccentrics or cranks are operated by means of racks is here made dependent upon the picking motion and this in such a manner that the throw of the box begins as soon as the batten and picker have again reached their initial position after the pick has been given and ends shortly before the beginning of the pick. In order that this ratio remain invariable, the driving shaft which operates the batten, is provided with common means for actuating the shuttle box as well as the picker, which means permit adjustment in any known manner relatively to said shaft. Thus if the pick is adjusted so that it takes place sooner or later the throw of the box also begins sooner or later in the same proportion. This result is obtained by the double utilization of that operative part of the picking motion which is mounted on the crank shaft of the loom (in this case the crank $b$).

Figure 1:
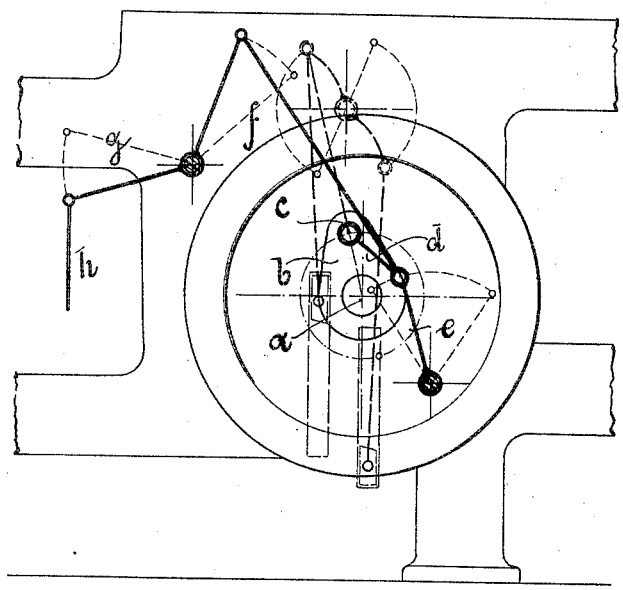
Figure 3:
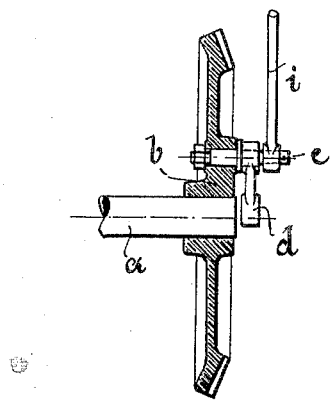
Figure 2:
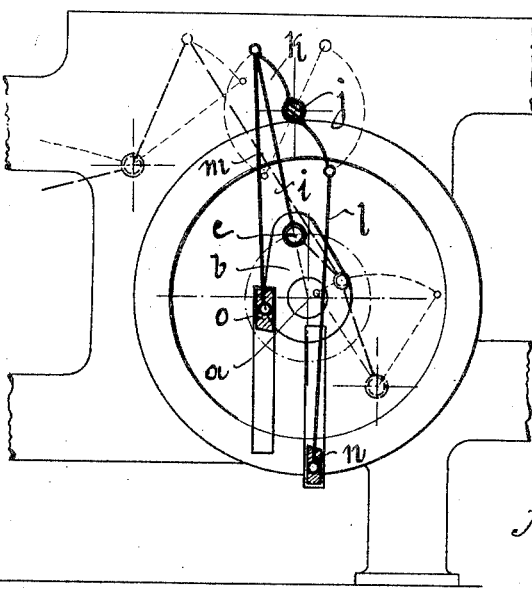
Figure 4:
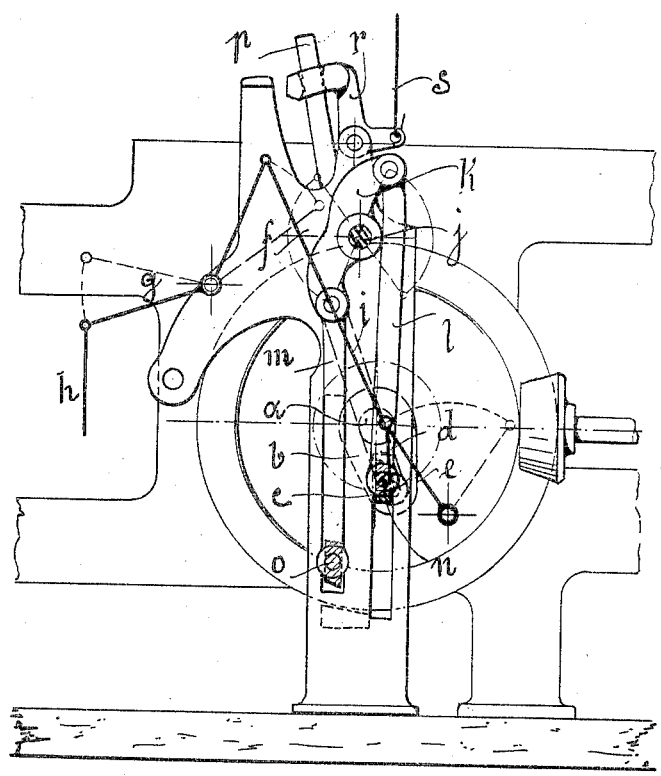
Figure 5:
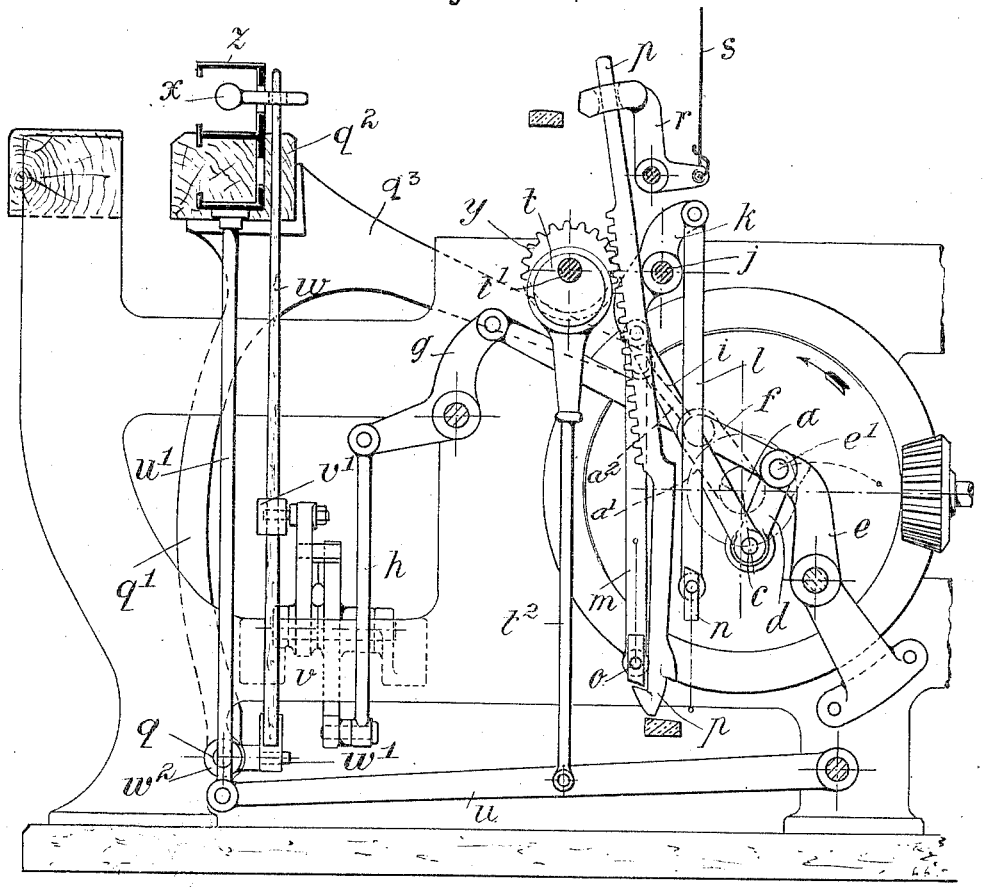

Figure 1 shows the picking device driven by the rotating crank $b$ with crank stud $c$. Fig. 2 shows on the contrary the movement of the knives for the change box motion, produced by the same crank $b$ with the same crank-stud $c$. Fig. 3 shows the crank-stud $c$, provided with the short link $d$ actuating the picking device (cr. Fig. 1) and the rod $i$ actuating the throw of the box (cr. Fig. 2) sitting beside the former on an elongation of the crank-stud. Fig. 4 shows the change box motion and the picking motion, the latter shortly before the beginning of the pick, and Fig. 5 illustrates part of a loom provided with my improved change box motion.

The driving wheel of the main shaft $a$ of a loom is provided with an integral crank $b$, the wrist-pin $c$ of which is, by link $d$ connected to a swinging arm $e$. The pintle $e'$ of link $d$, is by rod $f$ connected to a two-arm lever $g$, which in turn, by rod $h$, lever $v$, and strap $v'$ actuates the picker stick $w$ and hammer $x$, to drive the shuttles. Picker stick $w$ is fulcrumed on a forwardly projecting pin $w'$ of a sleeve $w^2$ which is fast on a rock shaft $q$ journaled in the loom frame, said shaft also carrying the lay sword $q'$ of lay $q^2$.

It will be seen that by the construction described, the picker stick may freely oscillate to drive the shuttles, while it also participates in the oscillating movement of the lay imparted to the latter from shaft $a$ in conventional manner through crank $a'$, link $a^2$ and the arm $q^3$ of sword $q'$. Wrist-pin $c$, is by link $i$ further connected to a two-arm lever $k$, pivoted at $j$, to the loom-frame. Lever $k$, is by rods $l$, $m$ connected to the knives $n$, $o$, respectively, which transmit motion to rack $p$. The latter meshes into a pinion $y$, fast on the shaft $t'$, of an eccentric $t$, which by rod $t^2$, transmits motion to a lever $u$. This lever is in turn by rod $u'$ connected to shuttle box $z$, and thus effects a raising or lowering of said box. By the construction described, the position of lever $k$, is dependent upon that of crank $b$, so that the beginning of the box raise is properly timed with relation to the beginning of the picking movement of the picker stick. At their upper ends, racks $p$ are engaged by levers $r$, connected to wires $s$, which are in turn influenced by the cards. By tilting levers $r$, their tappets are brought before either one of the knives, as will be readily understood.

It will be seen that by the construction described, crank $b$ actuates the picker sticks and also raises and lowers the shuttle box, the relative movements of sticks and boxes being so timed that the box raise is effected slightly before the picking device comes to a stop, while said raise is completed slightly before the shuttle is driven.

I claim:

A device of the character described, comprising a frame, a lay fulcrumed to the frame, a shuttle box and a picker stick co-operating with the lay, a shuttle box operating mechanism, a picker stick operating mechanism, means for oscillating the lay, and common means for actuating the shuttle box operating mechanism and the picker stick operating mechanism, said means permitting adjustment relatively to the lay oscillating means, whereby both the shuttle box operating mechanism and the picker stick operating mechanism may be adjusted in unison relatively to the lay oscillating means.

In witness whereof I have hereunto signed my name in the presence of two witnesses.

GEORG SCHWABE.

Witnesses:
 THEDOR SCHWARZ,
 FRIEDRICH SCHWARZ.

Copies of this patent may be obtained for five cents each, by addressing the "Commissioner of Patents, Washington, D. C."